(12) United States Patent
Estes

(10) Patent No.: US 6,769,845 B2
(45) Date of Patent: Aug. 3, 2004

(54) DOME REMOVAL TOOL

(75) Inventor: John Howard Estes, Spring, TX (US)

(73) Assignee: Matrix Tool, Inc., Spring, TX (US)

( * ) Notice: Subject to any disclaimer, the term of this patent is extended or adjusted under 35 U.S.C. 154(b) by 9 days.

(21) Appl. No.: 10/219,408

(22) Filed: Aug. 15, 2002

(65) Prior Publication Data

US 2004/0033112 A1 Feb. 19, 2004

(51) Int. Cl.[7] .............................................. B23B 51/00
(52) U.S. Cl. ...................... 408/203.5; 408/84; 408/204; 408/226
(58) Field of Search ........................... 408/203, 5, 204, 408/226, 72 B, 72 R, 84

(56) References Cited

U.S. PATENT DOCUMENTS

| 385,133 | A | * | 6/1888 | Perkins | 408/112 |
|---|---|---|---|---|---|
| 2,341,947 | A | * | 2/1944 | Roberts | 408/141 |
| 2,357,773 | A | * | 9/1944 | Sheskier | 408/127 |
| 2,576,786 | A | * | 11/1951 | Gray et al. | 408/84 |
| 3,620,635 | A | * | 11/1971 | DalBianco et al. | 408/84 |
| 3,907,452 | A | * | 9/1975 | Tripp | 408/56 |
| 3,973,784 | A | * | 8/1976 | Smith | 279/144 |
| 4,083,643 | A | | 4/1978 | Parone | |
| 4,306,823 | A | * | 12/1981 | Nashlund | 408/26 |
| 5,228,811 | A | | 7/1993 | Potter | |
| 5,318,390 | A | * | 6/1994 | DalBianco | 408/84 |
| 5,544,987 | A | * | 8/1996 | Gipson | 408/72 R |
| 5,893,684 | A | | 4/1999 | Skaggs | |
| 5,979,042 | A | * | 11/1999 | Duke | 29/739 |
| 6,203,253 | B1 | | 3/2001 | Perrault | |

FOREIGN PATENT DOCUMENTS

FR          2430288      *    3/1980

* cited by examiner

Primary Examiner—Daniel W. Howell
(74) Attorney, Agent, or Firm—Mary J. Gaskin

(57) ABSTRACT

A tool for removing the dome portion of a nail pin anchor, rivet, or other fastener. The tool, which is powered by a power drill, has a drilling end with a slot to accommodate the nail of the anchor. The balanced drill bit has six cutting points. A collar surrounds the body of the tool, allowing the installer to position it properly. Free-wheeling bearings allow the collar to remain stationary while the drilling end is rotating.

7 Claims, 3 Drawing Sheets

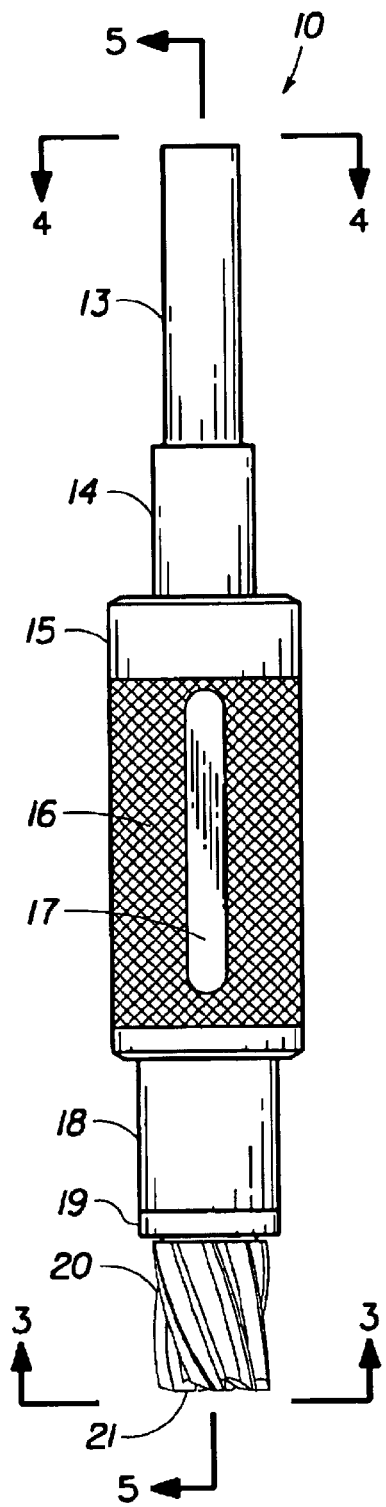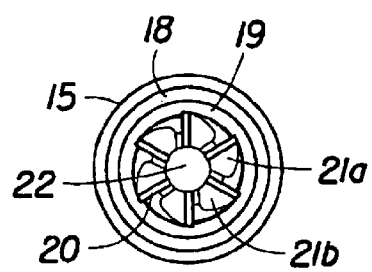
Fig. 3
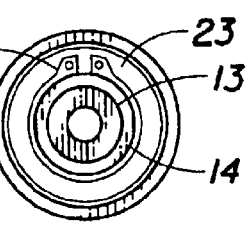
Fig. 4
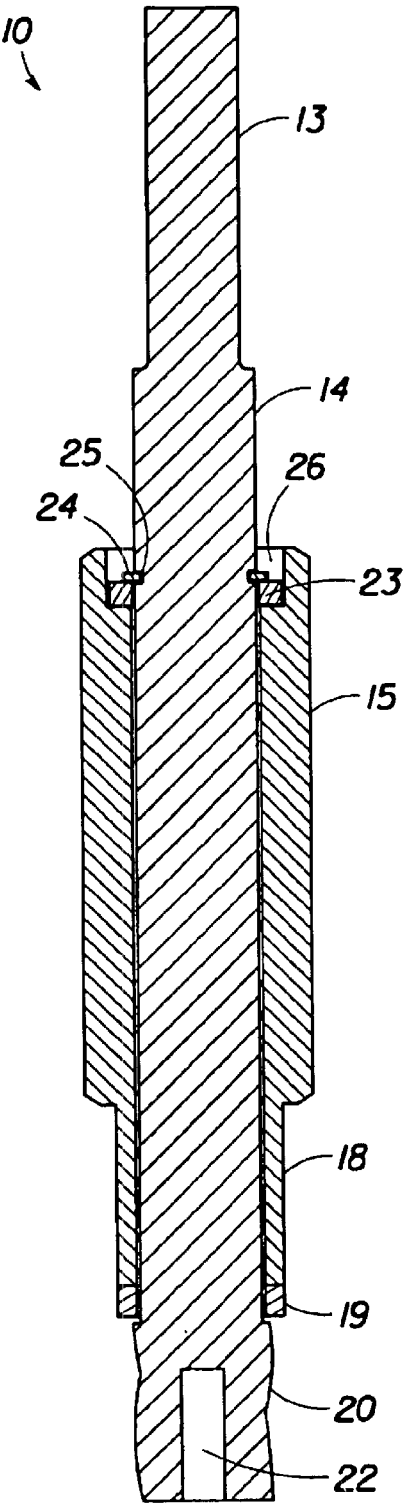
Fig. 2
Fig. 5

DOME REMOVAL TOOL

FIELD OF THE INVENTION

The invention relates generally to a tool for removing the domes of anchors, rivets and other fasteners used to attach parts or hold them together.

BACKGROUND OF THE INVENTION

For many years, installers have used nail pin anchors to anchor parts to walls or ceilings. Similarly, rivets and other fasteners with dome-shaped heads are used to fasten parts together. After installation, nail pin anchors, rivets and fasteners (hereinafter collectively called "anchors") are difficult to remove when the parts need to be removed or unfastened. Screwdrivers, chisels, and steel punches have been used to shear off the dome of the anchor, allowing the anchored part to be removed. However, the use of these implements can damage the surface of the ceiling or wall, as well as the part to be removed. The impact of missing the anchor can cause structural damage to the area surrounding the anchor, some of which may not be noticeable until structural failure results. In addition, the installer may suffer cut and bruised hands in the process of removing domes of anchors.

A need exists for a device which can safely and efficiently remove the dome of an anchor, rivet, or other fastener.

SUMMARY OF THE INVENTION

The present invention provides a tool which quickly and efficiently removes the dome portion of a nail pin anchor, rivet, or other fastener. The tool is inserted into the chuck end of a power drill. When the drill is activated, the tool "shaves off" the dome, leaving only the shank, or body, of the anchor, with the nail inside. Once the dome is removed, the material or part the anchor holds can be removed. The end of the nail can be tapped into the wall, or it can be removed by pulling it out with the claw end of a tool.

The tool described herein is designed to allow the installer to control the process of removing the dome of an anchor. The drilling end of the tool is designed to fit over the dome of the anchor. A slot is machined into the drilling end to accommodate the nail of the anchor as the drill bit removes the dome. The drill bit is balanced, with six cutting points, which eliminates kickbacks and keeps the drilling end from moving away from the anchor dome.

A collar surrounding the drill bit allows the installer to position the drilling end safely. A free-wheeling bearing allows the collar to remain stationary when it is held by the installer, while the drill bit is rotating. The collar also keeps the metal debris from clogging the drilling end and slowing down the process. A keeper pin locks the shaft of the drill bit to the collar. Drill bits of various sizes and types can be used with a single collar, making the tool very versatile.

It is an object of the present invention to provide a tool for quickly and efficiently removing the dome of an anchor.

Another object of the present invention is to provide a drill bit which fits over the dome of an anchor and accommodates the nail of the anchor.

Yet another object of the present invention is to provide a collar for allowing the drill bit to be easily and safely positioned by the installer.

A further object of the present invention is to provide a free-wheeling bearing so that the collar remains stationary while the drill bit rotates.

A still further object of the present invention is to provide a tool which accommodates interchangeable drill bits.

BRIEF DESCRIPTION OF THE DRAWINGS

FIG. 2 is a side elevational view of the tool of the present invention.

FIG. 3 is a bottom view of the tool of the present invention.

FIG. 4 is a top view of the tool of the present invention.

FIG. 5 is a cross-sectional view of the tool of the present invention.

DESCRIPTION OF PREFERRED EMBODIMENT

Figure 1:
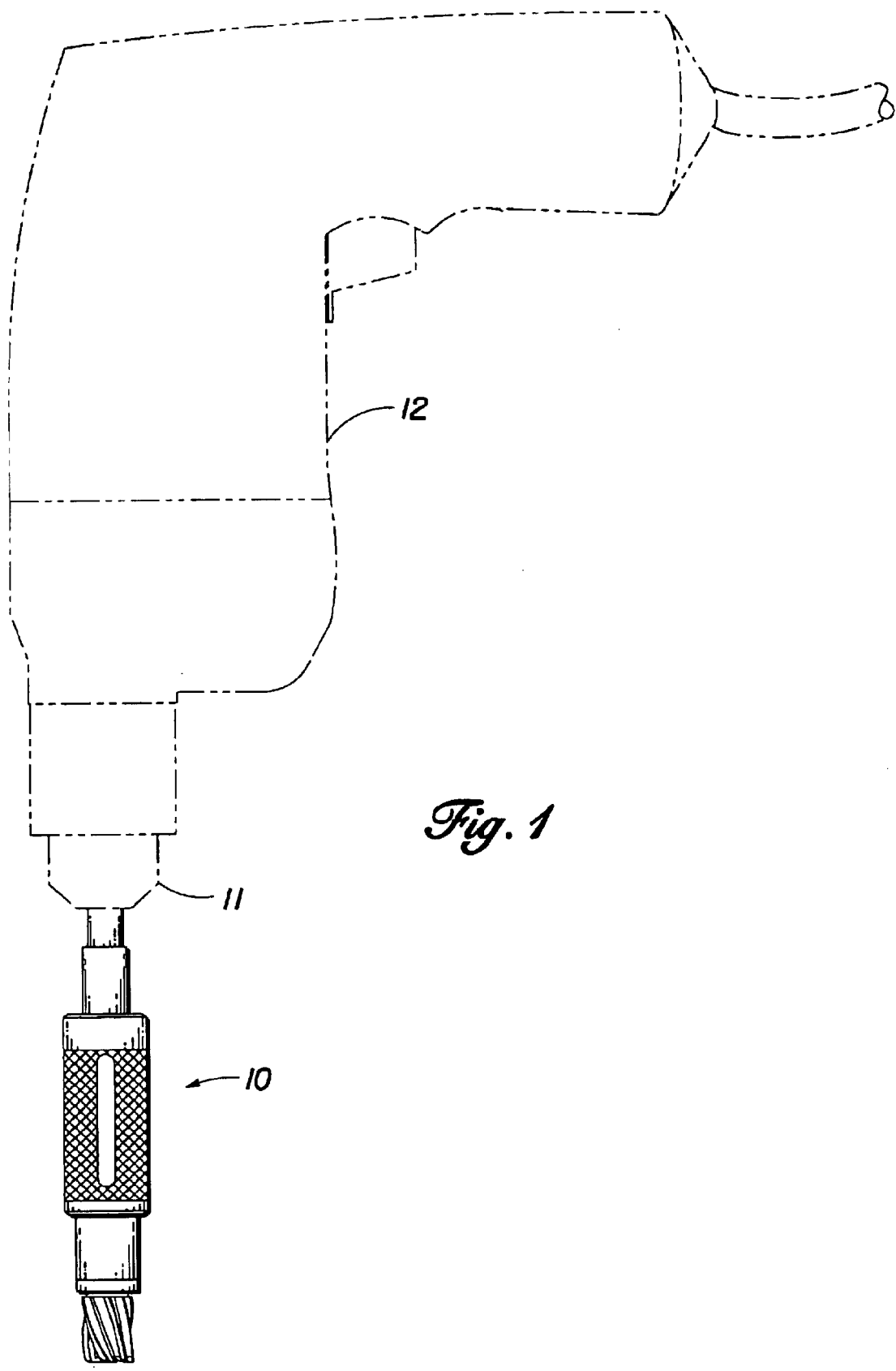
FIG. 1 is a side elevational view of the tool of the present invention inserted into the chuck end of a drill.

In FIG. 1, the tool 10 of the present invention is attached to the chuck end 11 of a power drill 12, ready for use in removing the domes of anchors, rivets, or other fasteners.

In FIG. 2, the tool 10 has a milled shank 13, which can be fabricated from a material such as tool steel, which is inserted into the chuck end 11 (not shown) of a drill 12 (not shown). The cylindrical shaft 14 of the tool 10, which is also fabricated from a material such as tool steel, is disposed inside a cylindrical collar 15, which can be fabricated from a material such as bronze. The collar 15 has knurls 16 on its surface, to improve handling by the installer. A nameplate 17 can be stamped onto the collar 15. The collar 15 has a narrower lower end 18 with a free-wheeling bearing 19 made of bronze. The shaft 14 terminates with a drill bit 20 with drill points 21, which extends down from the free-wheeling bearing 19 at the lower end 18 of the collar 15. The drill bit 20 can also be fabricated from tool steel.

As can be seen in the view in FIG. 3, the cylindrical collar 15 has a larger circumference than its lower end 18. The free-wheeling bearing 19 keeps the collar 15 from rotating when the drill 12 (not shown) is activated, causing the shaft 14 and drill bit 20 to rotate about a longitudinal axis. The drill bit 20 is balanced, with six drill points 21a, 21b, etc., spaced around its circumference. Typically, the end of the drill bit 20 is milled to fit over the dome of an anchor or rivet. A recessed nail guide 22 has been milled in the center of the drill bit 20 to accommodate the nail of an anchor while the dome is being drilled away.

As seen in the view in FIG. 4, inside the top of the collar 15 is a free-wheeling bearing 23 for keeping the collar 15 from rotating when the shank 13 and shaft 14 rotate. A circular snap ring 24 holds the shaft 14 of the tool 10 in place inside the collar 15.

The cross-sectional view of FIG. 5 shows the shank 13 of the tool 10, with the shaft 14 disposed inside the collar 15, terminating with the drill bit 20 extending from the free-wheeling bearing 19 at the lower end 18 of the collar 15. The recessed nail guide 22 has been milled to accommodate the nail of an anchor. The free-wheeling bearings 19 and 23 keep the collar 15 from rotating when the shank 13, shaft 14, and drill bit 20 are driven to rotate about a longitudinal axis. Free-wheeling bearing 19 also helps keep debris from jamming the drill bit 20. A recessed area 26 has been milled on the upper inner portion of the collar 15 for installation of the free-wheeling bearing 23, which is held in place by a snap ring 24, which fits into a milled groove 25 in shaft 14.

Figure 6A:
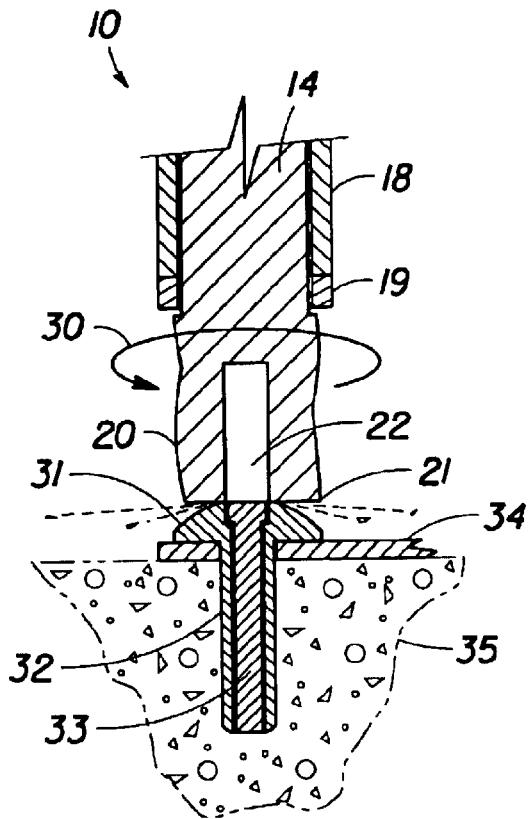
FIGS. 6A, 6B, and 6C are cross-sectional views of the lower part of the tool of the present invention as it removes the dome of a previously-installed anchor.
Figure 6B:
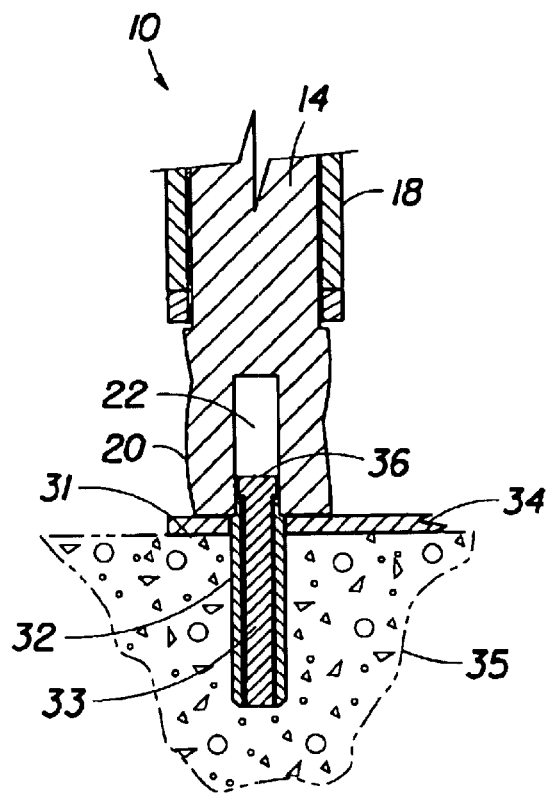
Figure 6C:
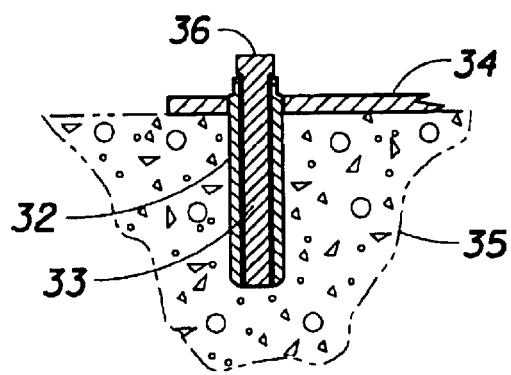

FIGS. 6A through 6C show the tool 10 in operation. A dome 31 of an anchor body 32 with a nail 33 inside has been installed in masonry 35, holding anchored material 34 in place.

In FIG. 6A, the power drill has been activated, and the shank 14 and the drill bit 20 are rotating about a longitudinal axis in a clockwise direction 30. Free-wheeling bearing 19 keeps the lower end 18 of the collar 15 from rotating. The drill points 21 have begun drilling away the dome 31. The recessed nail guide 22 will accommodate the nail 33 as the drill bit moves downward.

In FIG. 6B, the drill bit 20 has completely removed the dome, and the recessed nail guide 22 inside the drill bit 20 fits around the anchor nail head 36.

As can be seen in FIG. 6C, the anchored material 34 can now be removed. The anchor nail head 36 and anchor body 32 can either be removed with a claw tool or the nail 33 can be tapped into the masonry 35 with a mallet.

I claim:

1. A tool for attachment to a power drill, the tool being used to remove a dome of a fastener, said tool comprising:

an elongated, unitary cylindrical body member having a longitudinal centerline, and further having an upper connection end, a mid-portion, an a lower drilling end, the drilling end having a plurality of spiral fluted lands terminating with a plurality of drill points;

a cylindrical collar having a bore sized to fit around the mid-portion of the body member, the collar having an upper end and a lower end;

means for holding the collar in place around the body member;

a free-wheeling bearing disposed around the body member at the lower end of the collar, the bearing allowing the collar to remain stationary after the connection end of the body member is attached to the power drill, the drill being activated to rotate the body member around the longitudinal centerline.

2. The tool of claim 1, wherein the drilling end further has cylindrical slot formed around the longitudinal centerline of the body member.

3. The tool of claim 1 wherein the plurality of drill points are machined to form a concave surface for fitting over the dome of the fastener.

4. The tool of claim 1 wherein the collar has an outer surface with knurls machined thereon.

5. The tool of claim 1, wherein the body member is made from tool steel and the collar is made from bronze.

6. The tool of claim 1 wherein the bore at the upper end of the collar has a milled recess, and which further includes a second free-wheeling bearing disposed around the body member in the milled recess.

7. The tool of claim 1, wherein the plurality of drill points numbers six.

* * * * *